H. R. GEER.
CUTTING TOOL.
APPLICATION FILED DEC. 6, 1915.
1,210,457.
Patented Jan. 2, 1917.
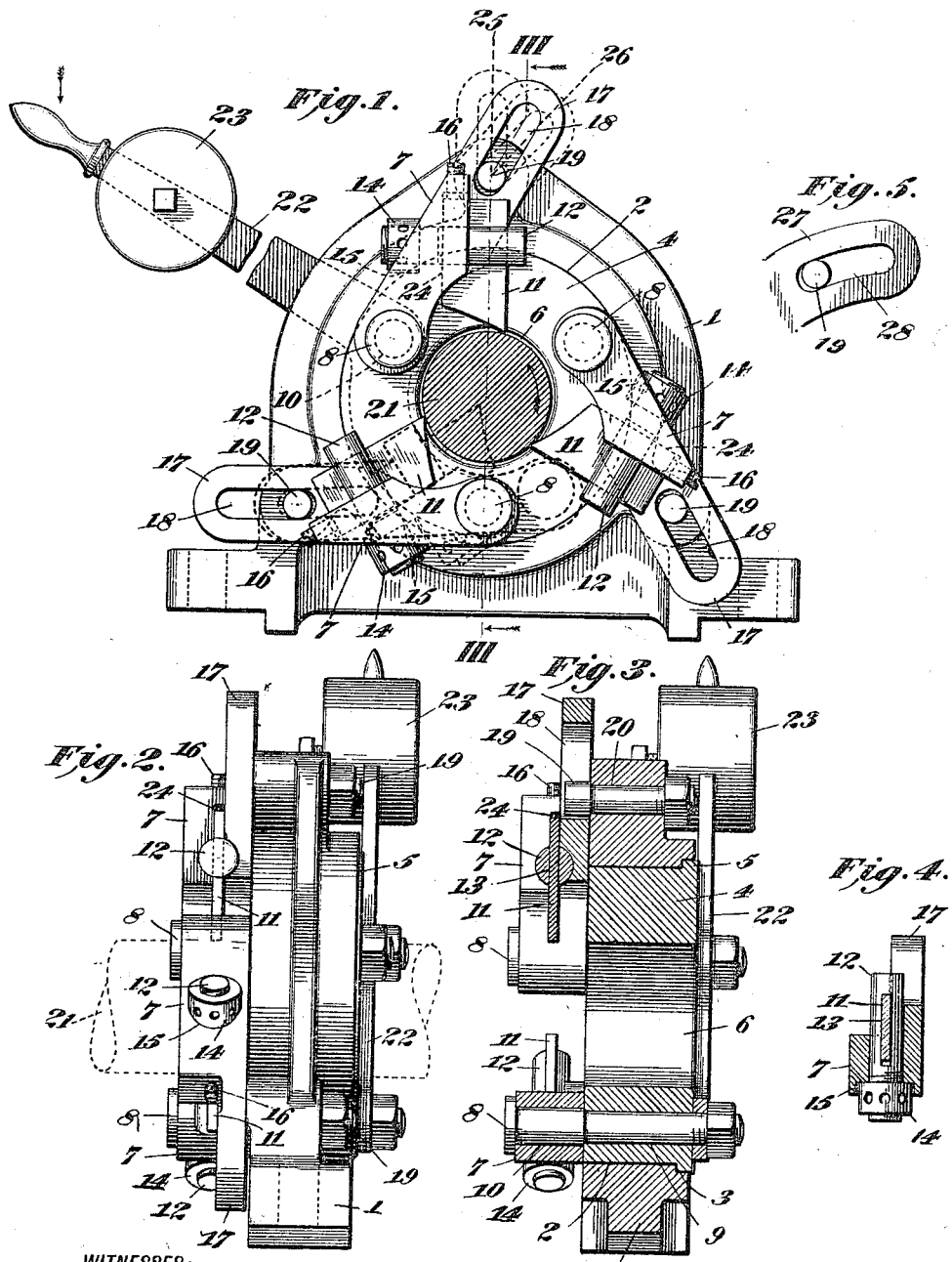
WITNESSES:
Elmer Seavey.
F. A. Stahl.
INVENTOR
Harry R. Geer.
BY Geo. E. Thackray
his ATTORNEY

UNITED STATES PATENT OFFICE.

HARRY R. GEER, OF JOHNSTOWN, PENNSYLVANIA.

CUTTING-TOOL.

1,210,457. Specification of Letters Patent. Patented Jan. 2, 1917.

Application filed December 6, 1915. Serial No. 65,180.

*To all whom it may concern:*

Be it known that I, HARRY R. GEER, a citizen of the United States, residing in the city of Johnstown, in the county of Cambria and State of Pennsylvania, (whose post-office address is Johnstown, Pennsylvania,) have invented certain new and useful Improvements in Cutting-Tools; and I do hereby declare the following to be a full, clear, and exact description of the invention, such as will enable others skilled in the art to which it appertains to make and use the same.

My invention relates to a cutting tool, with special reference to one that is adapted to cut bars of material and is particularly adapted to cut short lengths from round, square, hexagon, octagon or other shapes of bars. In doing this, my apparatus cuts the bar at substantially right angles to its axis by a clean cut, the portions thus cut off being true and flat on their ends and being substantially right cylinders of the proper form for future operations, as desired.

My invention consists essentially of a tool or a plurality of tools secured in holders, which holders are pivotally mounted upon a rotatable disk, which disk is held in suitable supports and adapted to be rotated for a portion of a revolution around its axis in either direction. The tool holders have extending portions, which extending portions are adapted to contact with fixed stops mounted on the main fixed framework of the cutting tool, and as the cutting edges of the tools contact with the rotating bar to be cut, the tendency of the tools is to automatically feed themselves into the bar while cutting a groove therein, and severing the bar, the feed therefore being self-governed. I also provide a lever handle attached to the rotatable disk to which may be attached a spring or weight to slightly assist the feed of the tools into the work. The rotation of the rotatable disk in one direction will feed the tools into the work and its rotation in the other direction will retract them from the work. I prefer to use a plurality of tools, as thereby the work is more speedily accomplished and the pressures produced upon the work by the tools will be centralized or balanced.

Having thus given a general description of my invention, I will now, in order to make the matter more clear, refer to the annexed sheet of drawings, which forms a part of this specification, and in which like characters indicate like parts.

Figure 1 is an end elevation of my cutting tool, showing a round bar in section in position to be severed; Fig. 2 is a side elevation of my cutting tool, showing the bar to be severed in dotted lines; Fig. 3 is a vertical sectional elevation on the line III—III of Fig. 1; Fig. 4 is a sectional elevation of the tool holder and tool; and Fig. 5 is a view of another form of construction of the outwardly extending portion of the tool holder.

Referring now to the characters of reference on the drawings:—1 is the housing of my cutting tool, which is adapted to be set and secured on a lathe bed or other similar machine, provided with means for grasping and rotating the bar 21, this lathe or other machine not being shown in the illustration. The housing 1 is provided with a circular opening therein, the center of which is substantially concentric with the axis of the bar, the surface of this opening being indicated generally as 2 and provided with a groove 3 to receive a corresponding annular projection 5 of the rotatable disk 4, which is fitted within and adapted to rotate backward or forward to a certain extent around its axis within the housing. The rotatable disk 4 is provided with a circular opening, the wall of which is indicated as 6, through which the bar 21 is adapted to pass. Mounted upon the rotatable disk 4 is a tool holder, or plurality of tool holders 7, each of which is pivoted thereto by means of a pin or bolt 8, which is fitted within a corresponding opening 9 in the rotatable disk 4, and which also fits within the opening 10 of the tool holder 7. The tool 11 is provided with a cutting edge, formed at any suitable angle desired, and this is retained in position on the tool holder 7 by means of the bolt 12, provided with a slot 13, the whole being screwed down by the spanner nut 14 to securely clamp and adjust it in place. This tool may be moved forward or backward and clamped securely in any position as desired. The spanner nut 14 fits within the socket 15 provided therefor in the tool holder 7, as illustrated. A set screw 16 is provided with a thread and inserted into a corresponding threaded opening whereby the slight adjustment of the tool may be accomplished. The outwardly extending portion of the tool holder 7 is provided with a portion 17 having an elongated slot 18 therein, within which slot is the end of the fixed pin 19, this pin 19 being secured to the housing through the hole or opening 20 therein, as illustrated. The bar to be cut is indicated as 21 and the position of the tools in beginning the cut is as illustrated in Fig. 1 by full lines, and the position of one of the tools when the cut is almost completed is as indicated by the dotted lines. A lever, or handle 22 is secured to the rotatable disk 4, and by the partial revolution of said disk by means of said handle, the tools can be projected against or into the surface of the bar to be cut, or by a movement in the opposite direction can be retracted from said bar. The lever or handle 22 is further provided with an adjustable weight 23, which weight, by force of gravity, tends to contact the tools with the bar to be cut, and this, together with the other means herein described, causes the tools to feed automatically into their work. In order to further secure the tool in position laterally, I provide a groove 24 in the tool holder 7, as illustrated, whereby, in coöperation with the other portions of the tool holder, the tool is firmly and adjustably fastened therein.

The apparatus as illustrated in Fig. 1 will tend to force the tools into the bar to be cut with a certain amount of force, due to the position and the direction of the slots 18 with respect to the bar and tools held on the other parts of the tool holders. I may, however, vary the position of this slot by making the extension 17 at a different angle than that shown by the full line of Fig. 1. If I want the automatic feed of the tool to be less, I construct the portion 17 so that the center line of the slot 18 extends substantially on the line from 19 to 25; and if I wish the feed of the tool into the bar to be greater, I arrange the extending portion of the tool holder 17 with the center line of the slot 18 extending from 19 to 26, all as illustrated by the dotted lines at the upper part of Fig. 1.

In Fig. 5 is shown a modified form of the outwardly extending portion of the tool holder, having a portion 27 with an elongated slot 28 therein, this slot being curved to a radius whose length is approximately equal to the distance between the center of the apparatus and the pin 19. This modified construction permits the tools to bite and dig deeper into the bar than the straight slots illustrated in Fig. 1, and requires less or no weight, such as 23, to force the tools into the work.

Having thus given a general description of my apparatus, I will now describe its operation: The tool being in the position illustrated in Fig. 1 and the bar 21 located as shown, the bar is rotated by any suitable means around its axis in the direction of the arrow, the edges of the tools contacting with the bar, proceed to cut a groove in the bar; and by reason of the forces thus produced, the rotatable disk 4 moves around its axis in the direction of the arrow, which motion causes the tool holders 7 to turn upon their pivots 8, whereupon the outwardly extending portion 17 of the tool holder in its movement causes the surface of the slot 18 therein to contact with the fixed pin 19, and this leverage thereby causes the tools to automatically bite or feed into the bar. As the rotation of the bar continues, the feed of the tools progresses whereby the tool severs the bar, as previously described. By reason of my construction, each of the tools has two forces acting upon it: one of these forces serving to cut the chips from the groove of the bar, due to the relative rotation of the bar and the tool; the other force acting upon the tool edges caused by the cutting resistance offered, acts to force the tools into the bar, thereby providing an automatic feed, which automatic feed is produced by the rotation of the bar itself acting directly upon the edges of the tools. The force which feeds the tools into the bar may be caused by apparatus of the character illustrated and described herein, or I may acomplish this by a somewhat differently arranged system of levers, cams, spiral backing or similar mechanism acting in substantially a similar way to produce a similar result.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:

1. A cutting tool, comprising a fixed housing, a rotatable disk mounted in said housing, a plurality of tools mounted in holders, one end of each of which is pivotally mounted on said rotatable disk, said tool holders having portions adapted to contact with fixed portions on said housing, and means for relatively rotating the bar and the tools.

2. A cutting tool, comprising a fixed housing, a rotatable disk mounted thereon, provided with a central opening adapted to receive, while permitting the rotation of the bar to be cut, a plurality of tool holders pivoted to said rotatable disk, said tool holders being provided with portions adapted to contact with and slide against fixed portions, and tools mounted in said holders adapted to contact with the bar.

3. In combination, a fixed casing, a revoluble disk mounted therein, tool holders pivotally connected to said disk, and each contacting with a projection on the casing, and tools mounted in said holders with their cutting edges adapted to contact with the work forward of a radius parallel to the front surface of said tool.

4. A cutting tool, comprising a fixed housing, a rotatable disk mounted therein, means for rotating said disk, fixed stops on said housing, tools mounted in holders pivoted to said revoluble disk and contacting with the stops aforesaid, the cutting edge of the tool contacting with the bar to be cut forward of a radius parallel to the front surface of said tool whereby as the bar and tools relatively rotate, said disk is gradually rotated, whereby said stops automatically feed the tools into the work, due to the cutting resistance thereof.

5. A cutting tool, comprising a fixed housing mounted on a lathe, a rotatable disk mounted in said housing provided with a central opening adapted to receive a bar, tools mounted in holders which are pivotally secured to said disk, stops on said housing adapted to slidably contact with said tool holders, whereby as the bar rotates, the disk is gradually rotated as the tool holders move in contact with said stops, causing the tools to be gradually fed into the work, due to the cutting resistance thereof.

6. A cutting tool, comprising a fixed housing, a rotatable disk mounted in said housing, tool holders pivotally mounted on said disk and having portions adapted to contact with stops on said housing, whereby the tools are automatically fed into the cut, and a handle on said disk adapted to rotate the same, whereby on the reversal of the rotation of said disk, the tools are withdrawn from the cut.

7. A cutting tool, comprising a fixed housing, a rotatable disk mounted in said housing, tool holders pivotally mounted on said disk and having portions adapted to contact with stops on said housing, whereby the tools are automatically fed into the cut, and a weighted handle on said disk adapted to rotate same, whereby on the reversal of the rotation of said disk, the tools are withdrawn from the cut.

8. A tool adapted to be moved toward or from the work, the cutting edge of said tool being forward of a radius of the work parallel to the front face of the tool, said tool being mounted in a tool holder pivotally connected with a revoluble disk mounted in a fixed housing, means for relatively traversing the tool and the work, and means operated by the cutting resistance adapted to project the tool into the work.

In witness whereof I have hereunto set my hand in the presence of two witnesses.

HARRY R. GEER.

Witnesses:
  GEORGE MOYER,
  LEONARD A. SEITZ, Jr.

Copies of this patent may be obtained for five cents each, by addressing the "Commissioner of Patents, Washington, D. C."